Oct. 28, 1947.　　　　J. BOVENZI　　　　2,429,797
HAND TRUCK
Filed Oct. 25, 1945

INVENTOR:
Joseph Bovenzi
BY
ATTORNEYS

Patented Oct. 28, 1947

2,429,797

UNITED STATES PATENT OFFICE 2,429,797

HAND TRUCK

Joseph Bovenzi, Syracuse, N. Y.

Application October 25, 1945, Serial No. 624,389

3 Claims. (Cl. 280—49)

This invention relates to hand trucks and has for its object such a truck which consists of a minimum number of parts and hence is economically manufactured. It has for its object a truck having an extensible handle with means for biasing the handle to apply friction between it and its guides to hold the handle in its adjusted or extended positions and also by such biasing initially coact with means as a fulcrum rib on the lower side of the platform to hold the handle in its adjusted or extended positions and at the same time permit the handle to be slid to and from its extended position.

The invention consists in the novel features and in the combinations and constructions hereinafter set forth and claimed.

In describing this invention, reference is had to the accompanying drawings in which like characters designate corresponding parts in all the views.

Figures 1, 2:
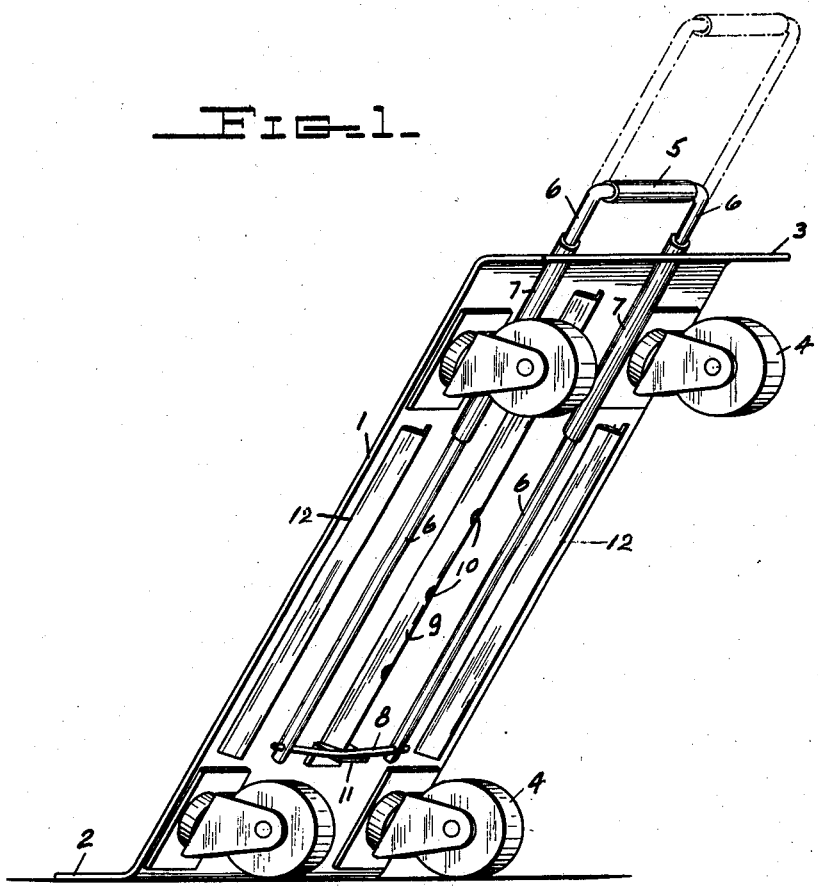
Figure 1 is a rear isometric view of this truck.
Figure 2 is a side elevation with all four casters on the floor.

The truck comprises generally a platform, supporting wheels therefor, an extensible handle having parallel side rods extending under the platform, tubular guides fixed on the lower side of the platform near its upper edge, and means for biasing the parallel rods transversely of the sliding movement to cause the rods to slidably bind on the walls of the guides.

I designates the platform of the truck, this being formed of sheet metal and having a lip or shelf 2 at one end, as its lower rim, considering the truck as standing nearly upright, for insertion under a load to be lifted and carried, and also having preferably a reversely extending lip 3 on its upper rim. The platform is provided with wheels and preferably casters 4 on the under side thereof and near its upper and lower ends. The casters or the mountings therefor are preferably secured to the platform, as by welding.

5 designates an extensible handle for the truck, this being U-shaped in general form and having elongated parallel rods 6 extending lengthwise of the lower side of the platform I on opposite sides of the lengthwise median line of the platform. For the purpose of guiding and also frictionally holding the handle from free movement and also holding it in its normal or extended positions, guides are provided with which the rods 6 frictionally engage. These guides are short lengthwise metal tubes 7 secured, as by welding, to the upper portion of the platform on the under side thereof and extending through holes in the lip 3. The tubular guides are parallel and spaced apart from the median line of the platform I.

The means for applying lateral force to the side rods 6 of the handle, that is, for biasing them laterally, so that they bind with sliding friction in the tubes 7 and also bind on the platform I, as here shown, is a spring bowed rod 8 extending crosswise of the lower ends of the side rods 6 of the handles and secured at its ends to said rods respectively and having its intermediate bowed portion fulcrumed and riding on the apex of a metal rib 9 extending lengthwise of the under side of the platform I along the median line thereof, this rib acting as a fulcrum and being preferably angular in cross section. It is provided with notches 10 at intervals in which the rod 8 snaps, when the handle 5 is extended predetermined distances. A suitable stop 11 is provided against which the rod 8 abuts, when the handle 6 telescopes into the guide tube 7 to its fullest extent. The friction applied by the reaction of the rod 8 and the consequent binding of the side rods 6 of the handle in the tubular guides 7 and also the friction between the spring rod 8 and the rib 9 is sufficient to hold the handle in its adjusted position during manipulation of the truck with the work thereon, and also premits the handle to be readily adjusted to any position. Reinforcing strips or ribs 12 may be provided on the lower side of the platform.

When the truck is used in horizontal position with all four wheels on the floor (Figure 2), it may be used as a push cart, the force being applied to the articles, boxes, etc. piled on the platform, in which case the handles may be telescoped inwardly, to its full extent. When lifting a load, by inserting the lip or shelf 2 under the load adjacent the floor, the handle 6 may be readily pulled out the proper distance to get an easy leverage, both for lifting the rod and wheeling the load.

What I claim is:

1. In a truck, a platform having wheels supporting the same, an extensible handle having parallel side rods, tubular guides on the lower side of the platform through which the rods extend, and means for biasing the rods transversely of the tubular guides and causing the rods to frictionally bind on the walls of the guides, said means being spaced and remote from the tubular guides and coacting with the rods to tilt the rods into inclined angles to the axes of the tubular guides.

2. In a truck, a platform having wheels supporting the same, an extensible handle having parallel side rods, tubular guides on the lower side of the platform through which the rods extend, and means for biasing the rods transversely of the tubular guides and causing the rods to frictionally bind on the walls of the guides, said means having a fulcrum rib on the lower side of the platform between the tubular guides, and a spring rod fulcruming on and slidable along the apex of the rib and having its ends secured to the rods.

3. In a truck, a sheet metal platform having annular lips at its upper and lower ends, the lip at the lower end constituting a shelf for insertion under the edge of articles to be carried, wheels mounted on the platform on the under side thereof, two of said wheels being located adjacent the lower lip, parallel tubular guides fixed to and extending lengthwise of the upper portion of the platform and through the upper lip, a handle U-shaped in general form having its side rods slidable through the tubular guides, a fulcrum rib on the lower side of the platform extending lengthwise midway of the platform, and a spring rod secured at its ends to the lower ends of the rods of the handles and having its intermediate portion pressing against the apex of the rib to bias the side portions of the handle to slidably bind in the tubes and to cause the spring rod to frictionally bind on the apex of the rib.

JOSEPH BOVENZI.

REFERENCES CITED

The following references are of record in the file of this patent:

UNITED STATES PATENTS

| Number | Name | Date |
|---|---|---|
| 1,042,193 | Bowling | Oct. 22, 1912 |
| 1,965,943 | Lea | July 10, 1934 |
| 2,235,044 | Ronning | Mar. 18, 1941 |